(12) United States Patent
Wang et al.

(10) Patent No.: US 9,456,273 B2
(45) Date of Patent: Sep. 27, 2016

(54) AUDIO MIXING METHOD, APPARATUS AND SYSTEM

(71) Applicant: Huawei Device Co., Ltd., Shenzhen (CN)

(72) Inventors: Dongqi Wang, Shenzhen (CN); Wuzhou Zhan, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 76 days.

(21) Appl. No.: 14/225,536

(22) Filed: Mar. 26, 2014

(65) Prior Publication Data

US 2014/0205115 A1     Jul. 24, 2014

Related U.S. Application Data

(63) Continuation of application No. PCT/CN2012/082952, filed on Oct. 15, 2012.

(30) Foreign Application Priority Data

Oct. 13, 2011     (CN) .......................... 2011 1 0309836

(51) Int. Cl.
*H04R 3/00* (2006.01)
*H04L 29/06* (2006.01)
(Continued)

(52) U.S. Cl.
CPC ................. *H04R 3/00* (2013.01); *H04L 12/18* (2013.01); *H04L 12/1822* (2013.01);
(Continued)

(58) Field of Classification Search
None
See application file for complete search history.

(56) References Cited

U.S. PATENT DOCUMENTS

| | | |
|---|---|---|
| 6,230,130 B1 * | 5/2001 | Castello da Costa et al. .............. 704/258 |
| 2002/0091847 A1 | 7/2002 | Curtin et al. |

(Continued)

FOREIGN PATENT DOCUMENTS

| | | |
|---|---|---|
| CN | 1953537 A | 4/2007 |
| CN | 101179693 A | 5/2008 |

(Continued)

OTHER PUBLICATIONS

Purnhagen, H., et al., "Clarifications Regarding the MCU Description," International Organisation for Standardisation, ISO/IEC JTC1/SC29/WG11, Coding of Moving Pictures and Audio, ISO/IEC JTC1/SC29/WG11, MPEG2009/M16657, Jun. 2009, 5 pages.

(Continued)

*Primary Examiner* — Curtis Kuntz
*Assistant Examiner* — Kenny Truong
(74) *Attorney, Agent, or Firm* — Conley Rose, P.C.; Grant Rodolph

(57) ABSTRACT

An audio mixing method, apparatus and system, which can ensure sound quality after audio mixing and reduce consumption of computing resources. The method includes: receiving an audio stream of each site, and analyzing the audio stream of each site to obtain a sound characteristic value of a sound source object; selecting, according to a descending sequence of sound characteristic values of sound source objects, a predetermined number of sound source objects from the sound source objects to serve as main sound source objects; determining, according to a relationship between a target site and the sites where the main sound objects are located, audio streams that require audio mixing for the target site; and performing audio mixing on the audio streams that require audio mixing for the target site and sending the audio streams after the audio mixing to the target site.

14 Claims, 5 Drawing Sheets

(51) Int. Cl.
*H04M 3/56* (2006.01)
*H04L 12/18* (2006.01)
*H04N 7/15* (2006.01)

(52) U.S. Cl.
CPC ........ *H04L 65/403* (2013.01); *H04L 65/4038* (2013.01); *H04L 65/604* (2013.01); *H04L 65/605* (2013.01); *H04L 65/607* (2013.01); *H04M 3/568* (2013.01); *H04R 3/005* (2013.01); *H04N 7/15* (2013.01)

(56) References Cited

U.S. PATENT DOCUMENTS

| | | | |
|---|---|---|---|
| 2006/0247045 A1* | 11/2006 | Jeong et al. | 463/35 |
| 2007/0133824 A1 | 6/2007 | Hibino et al. | |
| 2007/0274540 A1* | 11/2007 | Hagen et al. | 381/119 |
| 2007/0285505 A1 | 12/2007 | Korneliussen et al. | |
| 2007/0291951 A1 | 12/2007 | Faller et al. | |
| 2008/0008323 A1 | 1/2008 | Hilpert et al. | |
| 2009/0079815 A1 | 3/2009 | Baird et al. | |
| 2009/0125313 A1 | 5/2009 | Hellmuth et al. | |
| 2009/0125314 A1 | 5/2009 | Hellmuth et al. | |
| 2009/0171676 A1* | 7/2009 | Oh et al. | 704/500 |
| 2009/0326960 A1 | 12/2009 | Breebaart et al. | |
| 2010/0010818 A1 | 1/2010 | Oh et al. | |
| 2010/0010819 A1 | 1/2010 | Oh et al. | |
| 2010/0010820 A1 | 1/2010 | Oh et al. | |
| 2010/0010821 A1 | 1/2010 | Oh et al. | |
| 2010/0014680 A1 | 1/2010 | Oh et al. | |
| 2010/0014692 A1 | 1/2010 | Schreiner et al. | |
| 2010/0076774 A1 | 3/2010 | Breebaart et al. | |
| 2010/0121647 A1 | 5/2010 | Beack et al. | |
| 2010/0174548 A1 | 7/2010 | Beack et al. | |
| 2012/0224023 A1 | 9/2012 | Zhan | |
| 2013/0103393 A1 | 4/2013 | Wu et al. | |

FOREIGN PATENT DOCUMENTS

| | | |
|---|---|---|
| CN | 101335867 A | 12/2008 |
| CN | 101414462 A | 4/2009 |
| CN | 101547268 A | 9/2009 |
| CN | 101877643 A | 11/2010 |
| CN | 102065265 A | 5/2011 |
| EP | 1691348 A1 | 8/2006 |
| EP | 1853092 A1 | 11/2007 |
| EP | 1995721 A1 | 11/2008 |
| EP | 2146522 A1 | 1/2010 |

OTHER PUBLICATIONS

Birman, S., et al., "Synthesized Textures References Software in MPEG-4," International Organisation for Standardisation, ISO/IEC JTC1/SC29/WG11, Coding of Moving Pictures and Audio, ISO/IEC JTC1/SC29/WG11, M15335, Apr. 24, 2008, 4 pages.
Terentiev, L., et al., "Proposal for MCU Functionality Extension for the MPEG SAOC," International Organisation for Standardisation, ISO/IEC JTC1/SC29/WG11, Coding of Moving Pictures and Audio, ISO/IEC JTC1/SC29/WG11, MPEG2009/M16098, Feb. 2009, 6 pages.
Partial English Translation and Abstract of Chinese Patent Application No. CN001953537A, May 23, 2014, 4 pages.
Partial English Translation and Abstract of Chinese Patent Application No. CN101179693A, Mar. 11, 2014, 5 pages.
Partial English Translation and Abstract of Chinese Patent Application No. CN101335867A, Mar. 11, 2014, 3 pages.
Partial English Translation and Abstract of Chinese Patent Application No. CN101414462A, Mar. 11, 2014, 4 pages.
Foreign Communication From a Counterpart Application, PCT Application No. PCT/CN2012/082952, English Translation of International Search Report dated Jan. 24, 2013, 4 pages.
Foreign Communication From a Counterpart Application, PCT Application No. PCT/CN2012/082952, English Translation of Written Opinion dated Jan. 24, 2013, 10 pages.
"The Design and Implementation of Transparent Cascade in Video Conference," MCU, H.323, May 30, 2007, 84 pages.
"Information Technology—MPEG Audio Technologies—Part 2: Spatial Audio Object Coding (SAOC)," ISO/IEC JTC 1/SC29 N, ISO/IEC FDIS 23003-2:2010(E), ISO/IEC JTC 1/SC 29/WG 11, Mar. 10, 2010, 133 pages.
"Information Technolog—MPEG Audio Technologies—Part 1: MPEG Surround," ISO/IEC JTC 1/SC 29, ISO/IEC FDIS 23003-1:2006(E), ISO/IEC JTC 1/SC 29/WG 11, Jul. 21, 2006, 320 pages.

* cited by examiner

AUDIO MIXING METHOD, APPARATUS AND SYSTEM

CROSS-REFERENCE TO RELATED APPLICATIONS

This application is a continuation of International Application No. PCT/CN2012/082952, filed on Oct. 15, 2012, which claims priority to Chinese Patent Application No. 201110309836.6, filed on Oct. 13, 2011, both of which are hereby incorporated by reference in their entireties.

TECHNICAL FIELD

The present invention relates to the field of communications technologies, and in particular, to an audio mixing method, apparatus, and system.

BACKGROUND

With the development of communications technologies, people already can communicate with a conference participant in another conference site in real time through a video conference system. A typical video conference system is formed of a Multipoint control unit (MCU) and terminal devices. Generally, one site is configured with one terminal device, and one MCU is connected to multiple sites. A function of the terminal device is to collect sounds and images in a site, process the sounds and images, and transmit, through a network, the sounds and images to an MCU device connected to the terminal device; at the same time, the terminal also receives data of other sites sent by the MCU connected to the terminal device. A function of the MCU is to send, to the terminal device, audio signals received from other sites. However, limited by a device cost and bandwidth, in the prior art, the MCU does not send audio signals of all other sites to the terminal; instead, the MCU selects some audio signals according to a certain method and performs audio mixing, and then sends the mixed audio signals to the terminal.

A method in the prior art is that an MCU receives audio signals from all sites, selects a predetermined number of sites from all the sites according to a volume sequence of the sites, and performs audio mixing. In this case, even if main sound source objects concentrate in one site, audio streams of other unnecessary sites still need to be mixed, and too many unnecessary sites are involved in audio mixing; consequently, sound quality after the audio mixing is degraded, and unnecessary computing resources are consumed.

SUMMARY

Embodiments of the present invention provide an audio mixing method, apparatus, and system, which can ensure sound quality after audio mixing and reduce consumption of computing resources at the same time.

In order to achieve the foregoing objectives, the embodiments of the present invention adopt the following technical solutions:

An audio mixing method includes: receiving an audio stream of each site, and analyzing the audio stream of each site to obtain a sound characteristic value of a sound source object corresponding to each site; selecting, according to a descending sequence of sound characteristic values of sound source objects, a predetermined number of sound source objects from the sound source objects to serve as main sound source objects; determining sites where the main sound source objects are located; determining, according to a relationship between a target site and the sites where the main sound source objects are located, audio streams that require audio mixing for the target site; and performing audio mixing on the determined audio streams that require audio mixing for the target site, and sending the audio streams after the audio mixing to the target site; or sending, to the target site, the determined audio streams that require audio mixing for the target site to perform audio mixing in the target site.

An audio mixing apparatus includes: an analyzing unit configured to receive an audio stream of each site, and analyze the audio stream of each site to obtain a sound characteristic value of a sound source object corresponding to each site; a selecting unit configured to select, according to a descending sequence of sound characteristic values of sound source objects, a predetermined number of sound source objects from the sound source objects to serve as main sound source objects; a site determining unit configured to determine sites where the main sound source objects are located; an audio determining unit configured to determine, according to a relationship between a target site and the sites where the main sound source objects are located, audio streams that require audio mixing for the target site; and a sending unit configured to perform audio mixing on the determined audio streams that require audio mixing for the target site, and send the audio streams after the audio mixing to the target site; or a sending unit configured to send, to the target site, the determined audio streams that require audio mixing for the target site to perform audio mixing in the target site.

An audio mixing system includes an audio mixing apparatus and a site terminal.

Compared with the prior art in which sites to participate in audio mixing are selected according to volume of each site, in the audio mixing method, apparatus, and system provided in the embodiments of the present invention, main sound source objects are selected according to an energy value of each sound source object, and sites to participate in audio mixing are determined according to the main sound source objects, thereby preventing an unnecessary site from participating in audio mixing, ensuring sound quality after the audio mixing, and reducing consumption of computing resources at the same time.

BRIEF DESCRIPTION OF DRAWINGS

To describe the technical solutions in the embodiments of the present invention or in the prior art more clearly, accompanying drawings required for describing the embodiments or the prior art are introduced briefly in the following. The accompanying drawings in the following description merely show some embodiments of the present invention, and a person of ordinary skill in the art may further obtain other drawings according to these accompanying drawings without creative efforts.

DESCRIPTION OF EMBODIMENTS

The technical solutions in the embodiments of the present invention are clearly described in the following with reference to the accompanying drawings in the embodiments of the present invention. Obviously, the embodiments to be described are only a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
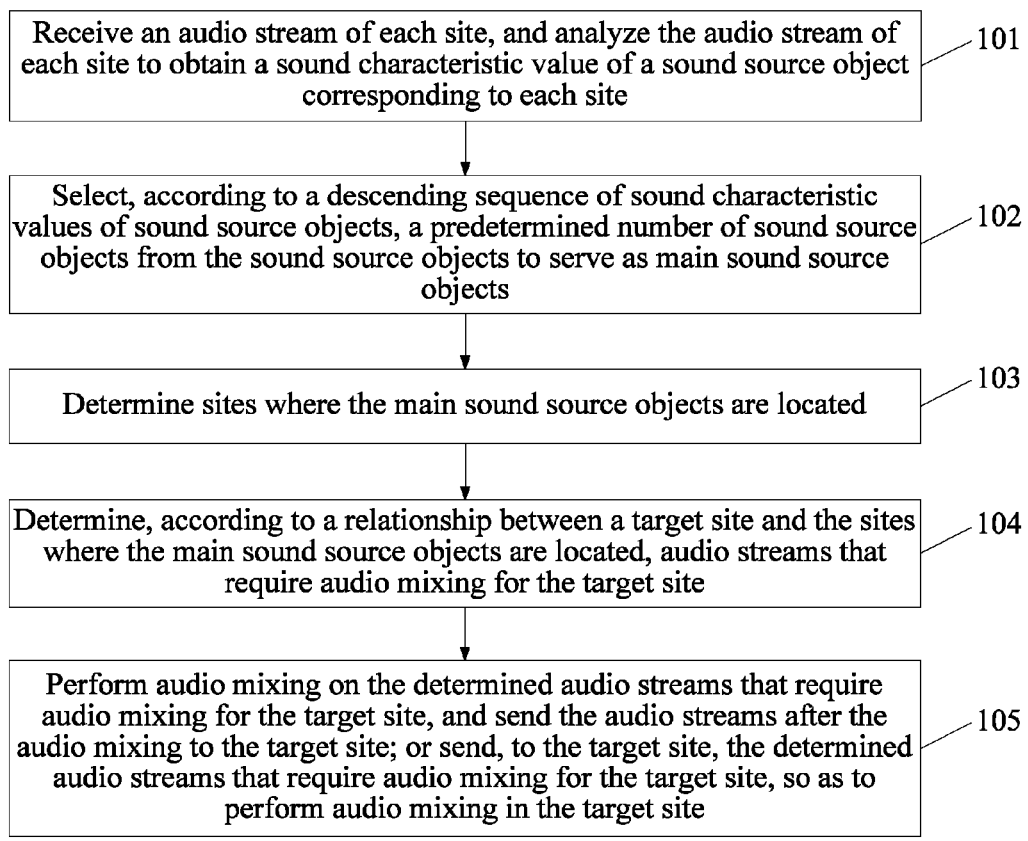
FIG. 1 is a flowchart of a method according to Embodiment 1 of the present invention.

The embodiment of the present invention provides an audio mixing method, and as shown in FIG. 1, the method includes:

101: Receive an audio stream of each site, and analyze the audio stream of each site to obtain a sound characteristic value of a sound source object corresponding to each site.

The received audio stream is an audio stream that includes information of the sound source object corresponding to each site, and therefore, the sound source object corresponding to each site may be obtained by parsing the received audio stream. For example, when spatial audio object coding (SAOC) is adopted, an MCU does not receive an audio stream corresponding to a fixed independent sound channel, but receives a stream that includes a down-mix signal and a corresponding spatial side information signal. Spatial side information in the stream is decoded, and if the spatial side information includes parameters such as absolute object energy (NRG) and object level difference (OLD), an energy value of the sound source object in the site may be calculated according to the parameters carried in the stream.

If the stream includes only an audio signal, but no parameter information related to the sound characteristic value, the stream needs to be decoded to obtain an uncompressed audio signal, and then the sound characteristic value of the audio signal is calculated. The sound characteristic value is calculated from the audio signal, and may be energy, volume, an envelope, or other characteristic values of the audio signal.

Furthermore, if the stream includes not only the audio signal, but also the parameter information related to the sound characteristic value, the sound characteristic value may be obtained through parsing the parameter information corresponding to the sound characteristic value in the stream, thereby reducing a computing amount of the MCU. A parameter related to the sound characteristic value may be a parameter that indirectly reflects a characteristic value such as energy or volume of the audio signal. For example, if the stream includes an average energy value of a group of audio signals and an energy percentage that each audio signal accounts for, an energy value of each audio signal may be calculated according to the foregoing two pieces of related parameter information. In the method of directly obtaining a sound characteristic value, a calculation of the sound characteristic value needs to be completed on a terminal device, and sound characteristic value information is included in an audio stream and sent to the MCU. For example, when spatial object coding is performed by using an SAOC technology, energy information corresponding to each sound source object may be obtained according to the NRG and OLD parameters. The NRG parameter is a maximum energy value among energy values of all objects, and the OLD parameter is a ratio of an energy value of each object to the NRG; therefore, an energy value of an $i^{th}$ sound source object is $ENG_{m,n}^{i} = OLD_{m,n}^{i} \times NRG_{m,n}$, $1 \leq i \leq P_{m,n}$. When both the NRG and the OLD are calculated, coded, and sent to the MCU, an energy value corresponding to each object may be obtained through extracting, on the MCU, NRG and an OLD corresponding to each object.

102: Select, according to a descending sequence of sound characteristic values of sound source objects, a predetermined number of sound source objects from the sound source objects to serve as main sound source objects.

The sound source objects are sorted in descending order according to the sound characteristic values calculated in step 101, and a predetermined number of sound source objects with relatively large sound characteristic values are selected to serve as main sound source objects.

103: Determine sites where the main sound source objects are located.

Sites to participate in audio mixing are determined by using the main sound source objects, which is unlike the prior art in which sites for audio mixing are selected according to volume of all sites.

104: Determine, according to a relationship between a target site and the sites where the main sound source objects are located, audio streams that require audio mixing for the target site. Audio mixing is performed on audio streams of the sites where the main sound source objects are located, and the audio streams after the audio mixing are sent to the target site.

A method for determining, according to a relationship between a target site and the sites where the main sound source objects are located, audio streams that require audio mixing for the target site is determining whether the target site is one of the sites where the main sound source objects are located; if the target site is one of the sites where the main sound source objects are located, determining audio streams of the sites where the main sound source objects are located except the target site as the audio streams that require audio mixing for the target site; and if the target site is not one of the sites where the main sound source objects are located, determining audio streams of all the sites where the main sound source objects are located as the audio streams that require audio mixing for the target site.

105: Perform audio mixing on the determined audio streams that require audio mixing for the target site, and send the audio streams after the audio mixing to the target site; or send, to the target site, the determined audio streams that require audio mixing for the target site to perform audio mixing in the target site.

After the audio streams that require audio mixing for the target site are determined, audio mixing may be performed, on the MCU, on the audio streams that require audio mixing for the target site, and then the streams after the audio mixing are sent to the target site.

Furthermore, after the audio streams that require audio mixing for the target site are determined, the audio streams that require audio mixing for the target site may also be combined and sent to the target site, and the audio mixing is performed by a terminal device in the target site, thereby reducing a computing amount of the MCU.

Compared with the prior art in which sites to participate in audio mixing are selected according to volume of each site, in the audio mixing method provided in the embodiment of the present invention, main sound source objects are selected according to an energy value of each sound source object, and sites to participate in audio mixing are determined according to the main sound source objects, thereby preventing an unnecessary site from participating in audio mixing, ensuring sound quality after the audio mixing, and reducing consumption of computing resources at the same time.

Embodiment 2

Figure 2:
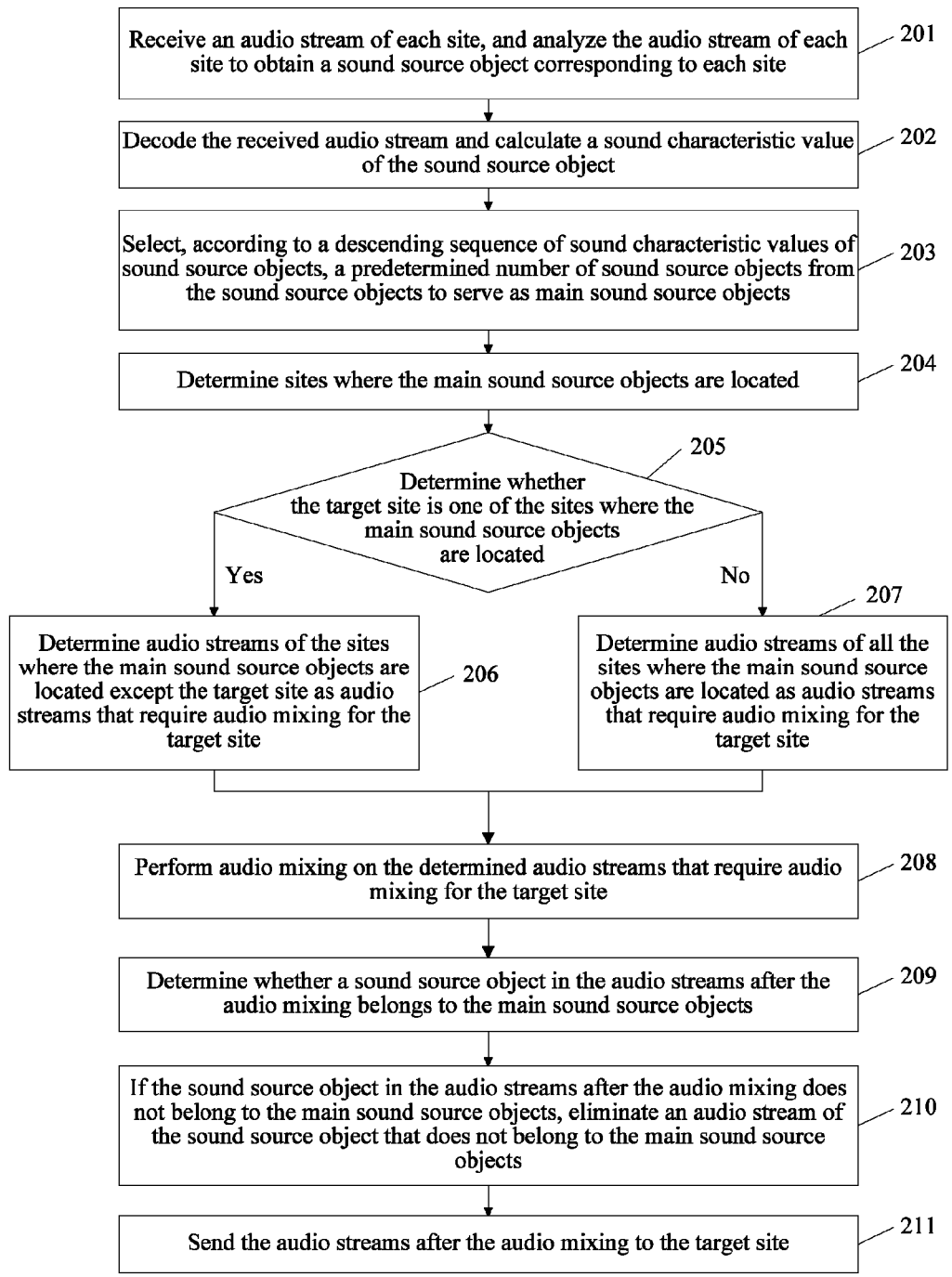
FIG. 2 is a flowchart of a method according to Embodiment 2 of the present invention.

The embodiment of the present invention provides an audio mixing method, and as shown in FIG. 2, the method includes:

201: Receive an audio stream of each site, and analyze the audio stream of each site to obtain a sound source object corresponding to each site.

Figure 3:
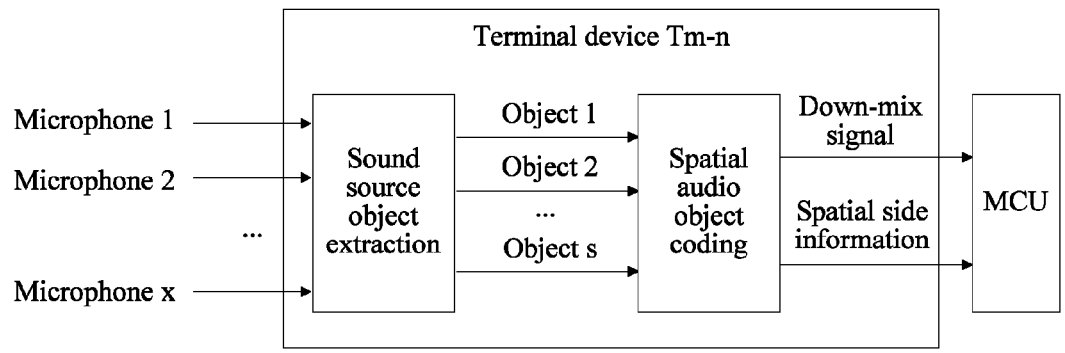
FIG. 3 is a schematic diagram of audio stream generation according to Embodiment 2 of the present invention.

Before receiving the audio stream of each site, a terminal device in each site takes the following measures: the terminal device in each site collects audio signals, and codes the audio signals, and sends the coded audio signals to an MCU. For example, as shown in FIG. 3, a terminal device captures sound information through x microphones in a site, and obtains x channels of digitalized microphone signals after analog to digital (AD) conversion. Sound source objects are extracted from the x channels of digitalized microphone signals; s channels of microphone signals with relatively high volume may be selected as sound source objects according to volume of each channel of microphone signal; or s sound source signals may be extracted by using a microphone array and a beamforming technology. Then, the extracted sound source objects are coded, and spatial audio object coding (SAOC) may be used as a coding manner herein. Audio signals of multiple sound channels are down-mixed to generate one channel of signal or two channels of signals, and a small amount of spatial side information is added; in this way, a bit rate and a transmission cost may be effectively reduced.

The MCU does not receive an audio signal corresponding to a fixed independent sound channel, but receives a down-mix signal and a corresponding spatial side information signal. The down-mix signal and the corresponding spatial side information signal are analyzed to obtain the sound source object corresponding to each site.

202: Decode the received audio stream and calculate a sound characteristic value of the sound source object.

To select main sound source objects from sound source objects of all sites, sound characteristic values of all sound source objects need to be calculated to perform comparison and selection according to the sound characteristic values in a next step. The sound characteristic values herein may be energy, volume, an envelope or other characteristic values.

Furthermore, to reduce a computing amount of the MCU, a calculation of the sound characteristic values may be completed on the terminal device, and sound characteristic value information is included in the spatial side information and directly sent to the MCU. For example, when spatial object coding is performed by using an SAOC technology, NRG and OLD parameters are added. The NRG parameter is a maximum energy value among energy values of all objects, and the OLD parameter is a ratio of an energy value of each object to the NRG; therefore, an energy value of an $i^{th}$ sound source object is $ENG_{m,n}^{i}=OLD_{m,n}^{i} \times NRG_{m,n}$, $1 \le i \le P_{m,n}$. When both the NRG and the OLD are calculated, coded, and sent to the MCU, an energy value corresponding to each object may be obtained through extracting, on the MCU, NRG and an OLD corresponding to each object.

203: Select, according to a descending sequence of the sound characteristic values of the sound source objects, a predetermined number of sound source objects from the sound source objects to serve as main sound source objects.

Figure 4:
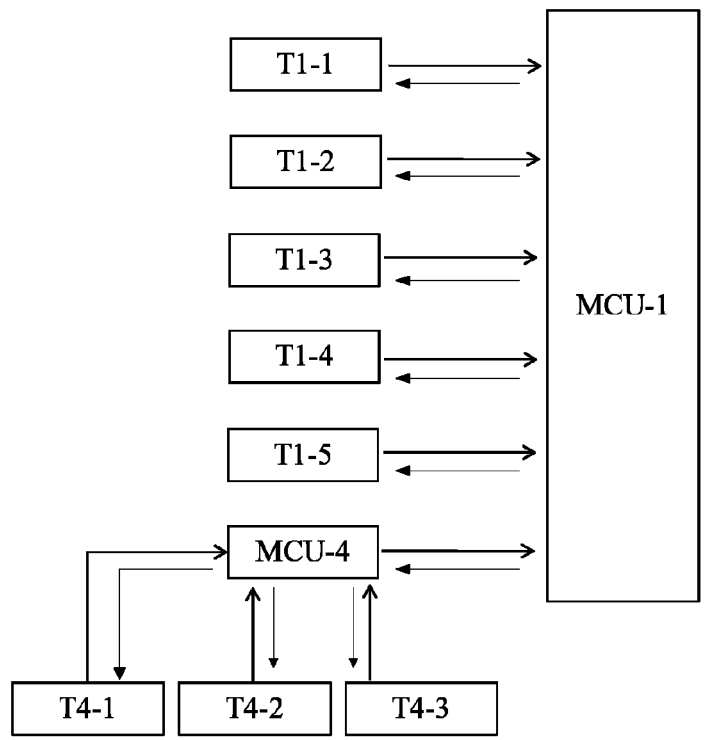
FIG. 4 is a schematic diagram of a connection between sites and MCUs according to Embodiment 2 of the present invention.

Using an MCU cascade scenario as an example, as shown in FIG. 4, an audio stream sent from each site and received by an MCU-1 in a certain frame and a corresponding sound characteristic value are shown in Table 1, where m represents a serial number of an MCU, n represents a serial number of a site connected to the MCU, and i represents an $i^{th}$ sound source object of all sound source objects included in an audio stream of a site.

TABLE 1

| $O_{m,n}^{i}$ | i = 1 | i = 2 | i = 3 | i = 4 |
|---|---|---|---|---|
| m = 1, n = 1 | 0.98 | 0.87 | 0.56 | |
| m = 1, n = 2 | 0.93 | 0.72 | 0.36 | |
| m = 1, n = 3 | 0.65 | | | |
| m = 1, n = 4 | 0.64 | 0.20 | | |
| m = 1, n = 5 | 0.32 | | | |
| m = 4, n = 1 | 0.92 | 0.76 | | |
| m = 4, n = 2 | 0.91 | 0.30 | 0.24 | |
| m = 4, n = 3 | 0.29 | 0.18 | | |

The predetermined number is a preset value, and may be set according to an actual situation and experience. In this embodiment, that four sound source objects are selected is used as an example. Four sound source objects are selected from all the sound source objects shown in Table 1 according to a descending sequence of the sound characteristic values, to serve as important sound source objects, for further audio mixing. After comparison, the four sound source objects with relatively large sound characteristic values are $O_{1,1}^{1}$, $O_{1,2}^{1}$, $O_{4,1}^{1}$, and $O_{4,2}^{1}$.

204: Determine sites where the main sound source objects are located.

Determining important sites according to the important sound source objects instead of selecting sites according to volume in the prior art may make the selection of sites more accurate and reliable. Still using the main sound source objects shown in Table 1 as an example, sites where the main sound source objects are located may be determined as T1-1, T1-2, T4-1, and T4-2.

205: Determine whether a target site is one of the sites where the main sound source objects are located; if the target site is one of the sites where the main sound source objects are located, execute step 206; and if the target site is not one of the sites where the main sound source objects are located, execute step 207.

Sound information may be transmitted directly in the target site, and may be presented in the site without audio mixing. Therefore, before audio mixing, determining whether the target site is one of the sites where the main sound source objects are located may reduce a computing amount and avoid sound repetition.

206: Determine audio streams of the sites where the main sound source objects are located except the target site as audio streams that require audio mixing for the target site.

When the target site is one of the sites where the main sound source objects are located, an audio stream of the target site does not require audio mixing; therefore, excluding the target site, audio mixing is performed on audio streams of other sites where the main sound source objects are located. For example, in FIG. 4, the target site T1-1 is one of the sites where the main sound source objects are located; therefore, audio mixing is performed on audio streams of the sites T1-2, T4-1, and T4-2, to serve as mixed audio streams of the target site T1-1.

207: Determine audio streams of all the sites where the main sound source objects are located as audio streams that require audio mixing for the target site.

When the target site is not one of the sites where the main sound source objects are located, audio mixing needs to be performed on the audio streams of all the sites where the main sound source objects are located. For example, in FIG. 4, the target site T1-3 is not one of the sites where the main sound source objects are located; therefore, audio mixing is performed on audio streams of all the main sites T1-1, T1-2, T4-1 and T4-2, to serve as mixed audio streams of the target site T1-3.

208: Perform audio mixing on the determined audio streams that require audio mixing for the target site.

209: Determine whether a sound source object in the audio streams after the audio mixing belongs to the main sound source objects.

When audio mixing is performed on the audio streams of the sites where the main sound source objects are located, other unimportant sound source objects in these sites are also mixed. For example, in FIG. 4, an audio stream of the selected site T1-1 not only includes a main sound source object $O_{1,1}^{1}$, but also includes unimportant sound source objects $O_{1,1}^{2}$ and $O_{1,1}^{3}$.

210: If the sound source object in the audio streams after the audio mixing does not belong to the main sound source objects, eliminate an audio stream of the sound source object that does not belong to the main sound source objects.

If the sound source object in the audio streams after the audio mixing does not belong to the main sound source objects, the sound source object is not an important sound source object that should be presented in an audio mixing process. To prevent unimportant sound source objects from affecting an audio mixing effect, these unimportant sound source objects need to be eliminated. A specific method may be, when audio mixing is performed on sound source objects of SAOC to generate an output stream, setting coefficients corresponding to unimportant sound source objects to 0 in a rendering matrix.

211: Send the audio streams after the audio mixing to the target site.

Through the foregoing steps, mixed audio streams that correspond to target sites are generated, and therefore, the mixed audio streams that correspond to the target sites only need to be sent to corresponding target sites.

Furthermore, it should be noted that, during elimination of the unimportant sound source objects, besides the method described in the foregoing step 209 and step 210, the following method may also be adopted, and the method specifically includes:

Before audio mixing, separate the main sound source objects from the audio streams in the sites corresponding to the main sound source objects, and perform audio mixing on the main sound source objects according to a relationship between a target site and the sites where the main sound source objects are located.

The performing audio mixing on the main sound source objects according to a relationship between a target site and the sites where the main sound source objects are located may be specifically implemented by adopting the following method:

For different target sites, different sound source objects should be selected for audio mixing. First, it is determined whether the target site is one of the sites where the main sound source objects are located; if the target site is one of the sites where the main sound source objects are located, audio mixing is performed on the main sound source objects except that in the target site; and if the target site is not one of the sites where the main sound source objects are located, audio mixing is performed on all the main sound source objects. For example, in FIG. 4, the target site T1-1 is one of the sites where the main sound source objects are located; therefore, excluding the sound source object $O_{1,1}^{1}$, audio mixing is performed on other main sound source objects $O_{1,2}^{1}$, $O_{4,1}^{1}$, and $O_{4,2}^{1}$, to serve as mixed audio streams of the target site T1-1. The target site T1-3 is not one of the sites where the main sound source objects are located, so audio mixing is performed on all the main sound source objects $O_{1,1}^{1}$, $O_{1,2}^{1}$, $O_{4,1}^{1}$, and $O_{4,2}^{1}$, to serve as mixed audio streams of the target site T1-3.

Furthermore, the audio mixing method provided in the embodiment of the present invention may further be: sending, to the target site, the determined audio streams that require audio mixing for the target site, and on a terminal device in the target site, performing audio mixing on the audio streams that require audio mixing for the target site.

Compared with the prior art in which sites to participate in audio mixing are selected according to volume of each site, in the audio mixing method provided in the embodiment of the present invention, main sound source objects are selected according to an energy value of each sound source object, and sites to participate in audio mixing are determined according to the main sound source objects, thereby preventing an unnecessary site from participating in audio mixing, ensuring sound quality after the audio mixing, and reducing consumption of computing resources at the same time.

Furthermore, in the embodiment of the present invention, the method of separating sound sources objects is adopted, and only important sound source objects are allowed to participate in audio mixing. Compared with a method of directly performing audio mixing on audio streams of sites in the prior art, an impact of unimportant sound source objects on an audio mixing effect is eliminated and sound quality after audio mixing is further improved.

Embodiment 3

Figure 5:
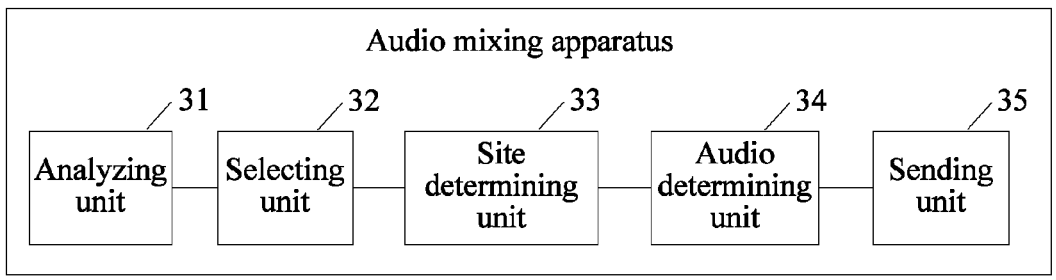
FIG. 5 is a schematic composition diagram of an audio mixing apparatus according to Embodiment 3 of the present invention.

The embodiment of the present invention provides an audio mixing apparatus, and as shown in FIG. 5, the apparatus includes an analyzing unit 31, a selecting unit 32, a site determining unit 33, an audio determining unit 34, and a sending unit 35.

The analyzing unit 31 is configured to receive an audio stream of each site, and analyze the audio stream of each site to obtain a sound characteristic value of a sound source object corresponding to each site.

An MCU does not receive an audio signal corresponding to a fixed independent sound channel, but receives a downmix signal of spatial audio object coding (SAOC) and a corresponding spatial side information signal. The sound source object corresponding to each site is obtained after the down-mix signal and the corresponding spatial side information signal are decoded.

The selecting unit 32 is configured to select, according to a descending sequence of sound characteristic values of sound source objects, a predetermined number of sound source objects from the sound source objects to serve as main sound source objects.

To select important sound source objects from sound source objects of all sites, sound characteristic values of all sound source objects need to be calculated to perform comparison and selection according to the sound characteristic values in a next step. The sound characteristic values herein may be energy, volume, an envelope or other sound characteristics.

Furthermore, to reduce a computing amount of the MCU, a calculation of sound characteristic values may be completed on a terminal device, and sound characteristic information is included in spatial side information and directly sent to the MCU. For example, when spatial object coding is performed by using an SAOC technology, NRG and OLD parameters are added. The NRG parameter is a maximum energy value among energy values of all objects, and the OLD parameter is a ratio of an energy value of each object to the NRG; therefore, an energy value of an $i^{th}$ sound source object is $ENG_{m,n}^{i}=OLD_{m,n}^{i} \times NRG_{m,n} 1 \leq i \leq P_{m,n}$. When both the NRG and OLD are calculated, coded, and sent to the MCU, an energy value corresponding to each object may be obtained through extracting, on the MCU, NRG and an OLD corresponding to each object.

The site determining unit 33 is configured to determine sites where the main sound source objects are located.

Determining important sites according to the important sound source objects instead of selecting sites according to volume in the prior art may make the selection of sites more accurate and reliable.

The audio determining unit 34 is configured to determine, according to a relationship between a target site and the sites where the main sound source objects are located, audio streams that require audio mixing for the target site.

A method for determining, according to a relationship between a target site and the sites where the main sound source objects are located, audio streams that require audio mixing for the target site is determining whether the target site is one of the sites where the main sound source objects are located; if the target site is one of the sites where the main sound source objects are located, determining audio streams of the sites where the main sound source objects are located except the target site as the audio streams that require audio mixing for the target site; and if the target site is not one of the sites where the main sound source objects are located, determining audio streams of all the sites where the main sound source objects are located as the audio streams that require audio mixing for the target site.

The sending unit 35 is configured to perform audio mixing on the determined audio streams that require audio mixing for the target site, and send the audio streams after the audio mixing to the target site; or the sending unit 35 is configured to send, to the target site, the determined audio streams that require audio mixing for the target site to perform audio mixing in the target site.

Furthermore, the analyzing unit 31 is further configured to decode the received audio stream and calculate a sound characteristic value of the sound source object. The analyzing unit 31 is further configured to extract the sound characteristic value of the sound source object from the received audio stream.

Using an MCU cascade scenario as an example, as shown in FIG. 4, an audio stream sent from each site and received by an MCU-1 in a certain frame and a corresponding sound characteristic value are shown in Table 1, where m represents a serial number of an MCU, n represents a serial number of a site connected to the MCU, and i represents an $i^{th}$ sound source object of all sound source objects included in an audio stream of a site.

The predetermined number is a preset value, and may be set according to an actual situation and experience. In this embodiment, that four sound source objects are selected is used as an example. Four sound source objects are selected from all the sound source objects shown in Table 1 according to a descending sequence of the sound characteristic values, to serve as important sound source objects, for further audio mixing. After comparison, the four sound source objects with relatively large sound characteristic values are $O_{1,1}^{1}$, $O_{1,2}^{1}$, $O_{4,1}^{1}$, and $O_{4,2}^{1}$.

Figure 6:
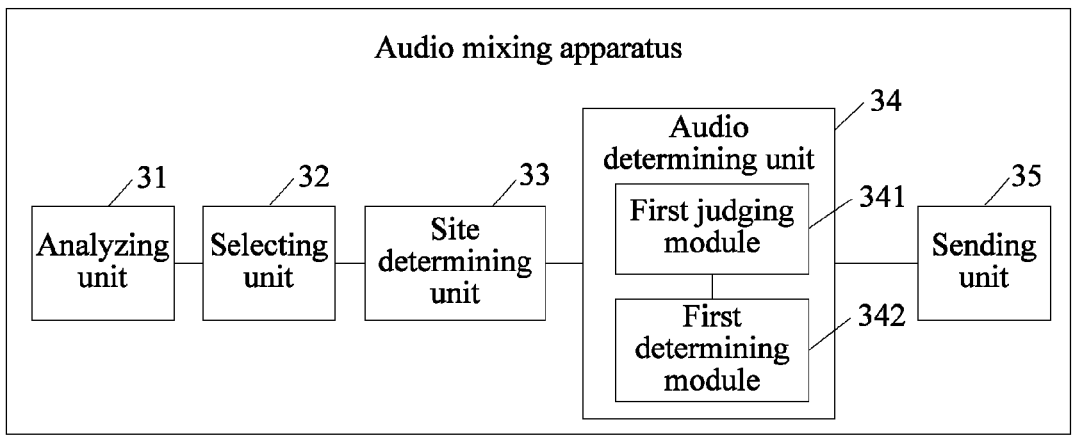
FIG. 6 is a schematic composition diagram of another audio mixing apparatus according to Embodiment 3 of the present invention.

Furthermore, as shown in FIG. 6, the audio determining unit 34 includes: a first judging module 341 configured to determine whether the target site is one of the sites where the main sound source objects are located; where sound information may be transmitted directly in the target site, and may be presented in the site without audio mixing; therefore, before audio mixing, determining whether the target site is one of the sites where the main sound source objects are located may reduce a computing amount and avoid sound repetition; and a first determining module 342 configured to, when the first judging module 341 determines that the target site is one of the sites where the main sound source objects are located, determine audio streams of the sites where the main sound source objects are located except the target site as the audio streams that require audio mixing for the target site.

When the target site is one of the sites where the main sound source objects are located, it is unnecessary to determine an audio stream of the target site as an audio stream that requires audio mixing for the target site; therefore, excluding the target site, audio mixing is performed on audio streams of other sites where the main sound source objects are located. For example, in FIG. 4, the target site T1-1 is one of the sites where the main sound source objects are located; therefore, audio mixing is performed on audio streams of the sites T1-2, T4-1, and T4-2, to serve as mixed audio streams of the target site T1-1

The first audio mixing module 342 is further configured to, when the first judging module 341 determines that the target site is not one of the sites where the main sound source objects are located, determine audio streams in all the sites where the main sound source objects are located as the audio streams that require audio mixing for the target site.

When the target site is not one of the sites where the main sound source objects are located, the audio streams of all the sites where the main sound source objects are located need to be determined as the audio streams that require audio mixing for the target site. For example, in FIG. 4, the target site T1-3 is not one of the sites where the main sound source objects are located, therefore, audio mixing is performed on audio streams of all the main sites T1-1, T1-2, T4-1 and T4-2, to serve as mixed audio streams of the target site T1-3.

Figure 7:
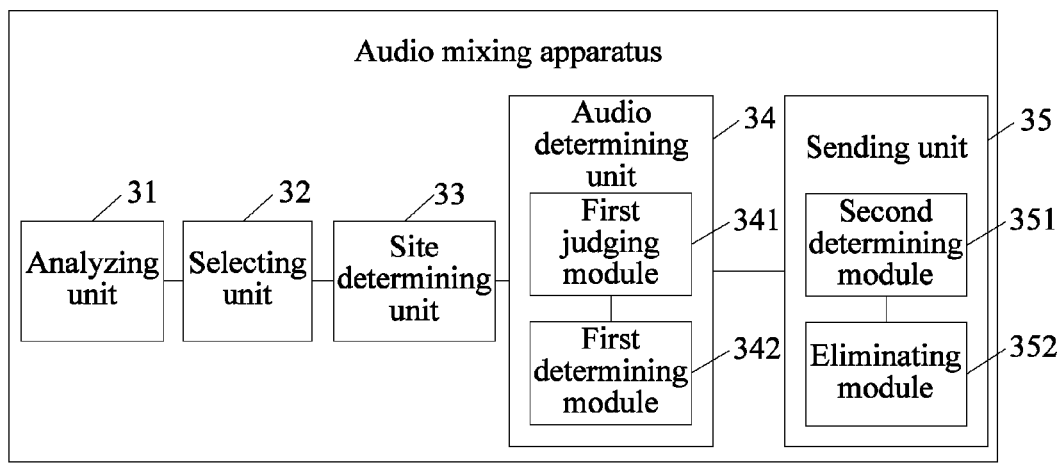
FIG. 7 is a schematic composition diagram of another audio mixing apparatus according to Embodiment 3 of the present invention.

Further, as shown in FIG. 7, the sending unit 35 further includes: a second determining module 351 configured to, before the audio streams after the audio mixing are sent to the target site, determine whether a sound source object in the audio streams after the audio mixing belongs to the main sound source objects; where when audio mixing is performed on the audio streams of the sites where the main sound source objects are located, other unimportant sound source objects in these sites are also mixed; for example, in FIG. 4, an audio stream of the main site T1-1 not only includes a main sound source object $O_{1,1}^{1}$, but also includes unimportant sound source objects $O_{1,1}^{2}$ and $O_{1,1}^{3}$; and an eliminating module 352 configured to, when the determining module 351 determines that the sound source object in the audio streams after the audio mixing does not belong to the main sound source objects, eliminate an audio stream of the sound source object that does not belong to the main sound source objects.

If the sound source object in the audio streams after the audio mixing does not belong to the main sound source objects, the sound source object is not an important sound source object that should be presented in an audio mixing process. To prevent unimportant sound source objects from affecting an audio mixing effect, these unimportant sound source objects need to be eliminated. A specific method may be, when audio mixing is performed on sound source objects of SAOC to generate an output stream, setting coefficients corresponding to unimportant sound source objects to 0 in a rendering matrix.

Figure 8:
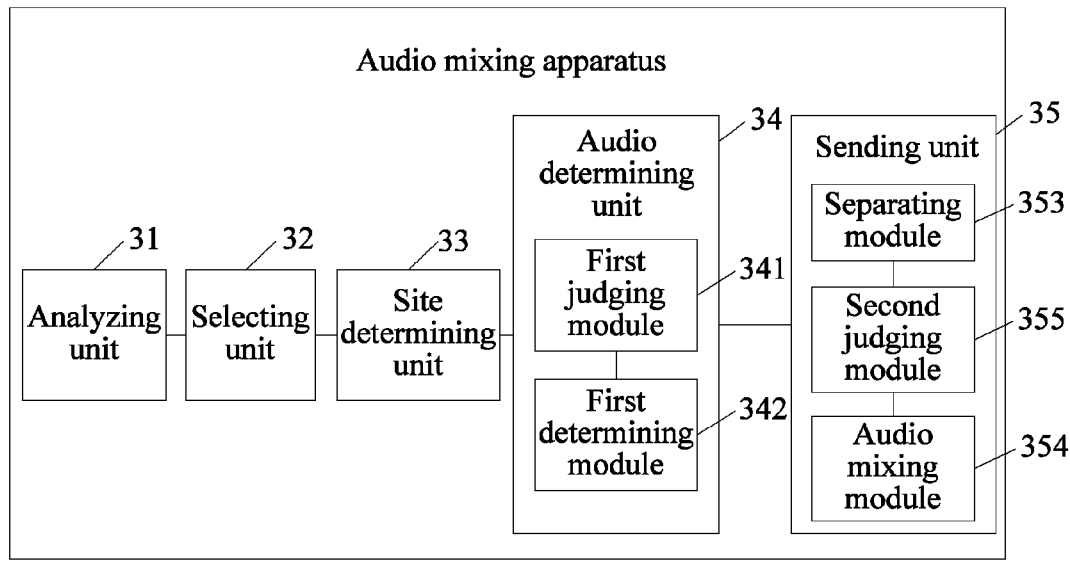
FIG. 8 is a schematic composition diagram of another audio mixing apparatus according to Embodiment 3 of the present invention.

Further, as shown in FIG. 8, the sending unit 35 further includes: a separating module 353 configured to separate the main sound source objects from the audio streams of the sites corresponding to the main sound source objects; an audio mixing module 354 configured to perform audio mixing on the main sound source objects according to the relationship between the target site and the sites where the main sound source objects are located; and a second judging module 355 configured to determine whether the target site is one of the sites where the main sound source objects are located.

The audio mixing module 354 is further configured to perform audio mixing on the main sound source objects except that in the target site when the second judging module 355 determines that the target site is one of the sites where the main sound source objects are located.

For example, in FIG. 4, the target site T1-1 is one of the sites where the main sound source objects are located; therefore, excluding the sound source object $O_{1,1}^{1}$, audio mixing is performed on other main sound source objects $O_{1,2}^{1}$, $O_{4,1}^{1}$, and $O_{4,2}^{1}$, to serve as mixed audio streams of the target site T1-1.

The audio mixing module 354 is further configured to perform audio mixing on all the main sound source objects when the second judging module 355 determines that the target site is not one of the sites where the main sound source objects are located.

For example, in FIG. 4, the target site T1-3 is not one of the sites where the main sound source objects are located, so audio mixing is performed on all the main sound source objects $O_{1,1}^{1}$, $O_{1,2}^{1}$, $O_{4,1}^{1}$, and $O_{4,2}^{1}$, to serve as mixed audio streams of the target site T1-3.

Figure 9:
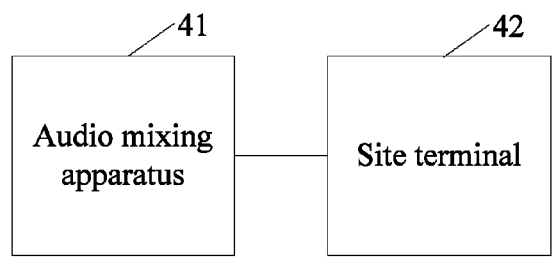
FIG. 9 is a schematic composition diagram of an audio mixing system according to Embodiment 3 of the present invention.

An embodiment of the present invention further provides an audio mixing system, which, as shown in FIG. 9, includes an audio mixing apparatus 41 and a site terminal 42.

The site terminal 42 is configured to collect an audio signal from each site, perform coding and compression processing on the collected audio signal, and send the collected audio signal to the audio mixing apparatus 41 in a form of an audio stream.

The site terminal 42 is further configured to receive audio streams that require audio mixing for a target site and are sent by the audio mixing apparatus 41, and perform audio mixing on the received audio streams in the target site.

It should be noted that for other description of functional modules included in the audio mixing system provided in the embodiment of the present invention, reference may be made to the description of corresponding apparatuses in Embodiment 1, Embodiment 2, and Embodiment 3; and details are not repeatedly described herein in the embodiment of the present invention.

Compared with the prior art in which sites to participate in audio mixing are selected according to volume of each site, in the audio mixing apparatus and system provided in the embodiments of the present invention, main sound source objects are selected according to an energy value of each sound source object, and sites to participate in audio mixing are determined according to the main sound source objects, thereby preventing an unnecessary site from participating in audio mixing, ensuring sound quality after the audio mixing, and reducing consumption of computing resources at the same time.

Furthermore, in the embodiments of the present invention, the method of separating sound sources objects is adopted, and only important sound source objects are allowed to participate in audio mixing. Compared with a method of directly performing audio mixing on audio streams of sites in the prior art, an impact of unimportant sound source objects on an audio mixing effect is eliminated and sound quality after audio mixing is further improved.

Furthermore, in the audio mixing system of the present invention, mixed audio streams are parsed and selected on the audio mixing apparatus, audio streams needing to participate in audio mixing are sent to a terminal in a target site, and then the terminal in the site performs audio mixing processing, thereby effectively saving a computing amount of the audio mixing apparatus and improving audio mixing efficiency.

Through the foregoing description of the implementation manners, a person skilled in the art may clearly understand that the present invention may be accomplished by software plus necessary universal hardware, and definitely may also be accomplished by hardware, but in most cases, the former is a preferred implementation manner. Based on this, the technical solutions of the present invention or the part that makes contributions to the prior art may be substantially embodied in a form of a software product. The computer software product is stored in a readable storage medium, for example, a floppy disk, a hard disk, or an optical disc of a computer, and includes several instructions used to instruct a computer device (which may be a personal computer, a server, or a network device, or the like) to perform the methods according to the embodiments of the present invention.

The foregoing description is merely specific implementation manners of the present invention, but not intended to limit the protection scope of the present invention. Various variations and replacements easily made by a person skilled in the art within the technical scope disclosed by the present invention shall fall within the protection scope of the present invention. Therefore, the protection scope of the present invention is subject to the protection scope of the appended claims.

What is claimed is:
1. An audio mixing method, comprising:
receiving, from a first site, a first audio stream that comprises a first plurality of sound source objects;
receiving, from a second site, a second audio stream that comprises a second plurality of sound source objects;

receiving, from a third site, a third audio stream that comprises a third plurality of sound source objects;

analyzing the first audio stream to obtain a sound characteristic value of each of the plurality of sound source objects;

analyzing the second audio stream to obtain a sound characteristic value of each of the second plurality of sound source objects;

analyzing the third audio stream to obtain a sound characteristic value of each of the third plurality of sound source objects;

selecting, according to a descending sequence of sound characteristic values of the first plurality of sound source objects, the second plurality of sound source objects, and the third plurality of sound source objects, a predetermined number of sound source objects from the first plurality of sound source objects, the second plurality of sound source objects, and the third plurality of sound source objects to serve as main sound source objects, wherein a portion, but not all, of each of the first plurality of sound source objects, the second plurality of sound source objects, and the third plurality of sound source objects are selected as main sound source objects for audio mixing, and wherein a sound source object that is not selected as a main sound source object in an audio stream that contains a main sound source object is muted without muting the main sound source object or the audio stream;

determining each site selected from among the first site, the second site, and the third site from which each of the main sound source objects were received in an audio stream;

determining a target site selected from among the first site, the second site, and the third site; determining audio streams that require audio mixing as audio streams received from each site selected from among the first site, the second site, and the third site, but not the target site, from which each of the main sound source objects were received in the audio stream; and either performing audio mixing on the determined audio streams that require audio mixing for the target site, and sending the audio streams after the audio mixing to the target site; or sending to the target site the determined audio streams that require audio mixing for the target site to perform audio mixing in the target site.

2. The audio mixing method according to claim 1, wherein analyzing an audio stream to obtain the sound characteristic value of a sound source object comprises:
  decoding the audio stream; and
  calculating the sound characteristic value of the sound source object.

3. The audio mixing method according to claim 1, wherein analyzing an audio stream to obtain the sound characteristic value of a sound source object comprises extracting the sound characteristic value of the sound source object from the audio stream.

4. The audio mixing method according to claim 1, wherein performing the audio mixing on the determined audio streams that require audio mixing for the target site comprises:
  separating the main sound source objects from the determined audio streams; and
  performing audio mixing on the main sound source objects according to a relationship between the target site, the first site, the second site, and the third site.

5. The audio mixing method according to claim 4, wherein performing audio mixing on the main sound source objects according to the relationship between the target site, the first site, the second site, and the third site comprises performing audio mixing on the main sound source objects that were not received from the target site.

6. The audio mixing method according to claim 4, wherein performing audio mixing on the main sound source objects according to the relationship between the target site, the first site, the second site, and the third site comprises performing audio mixing on all the main sound source objects when the target site is not one of the sites from which the main sound source objects were received.

7. The audio mixing method according to claim 1, further comprising performing, on a terminal device in the target site, audio mixing on the determined audio streams that require audio mixing for the target site.

8. An audio mixing apparatus comprising:
  a computer processor configured to:
    receive an audio stream from a first site, a second site, and a third site, wherein each audio stream comprises a plurality of sound source objects;
    analyze the audio stream of the first site, the second site, and the third site to obtain a sound characteristic value of each sound source object;
    select, according to a descending sequence of sound characteristic values of the sound source objects, a predetermined number of the sound source objects to serve as main sound source objects, wherein a portion, but not all, of the plurality of sound source objects are selected as main sound source objects for audio mixing, and wherein a sound source object that is not selected as a main sound source object in an audio stream that contains a main sound source object is muted without muting the main sound source object or the audio stream;
    determine each site selected from among the first site, the second site, and the third site from which each of the main sound source objects were received in an audio stream;
    determine a target site selected from among the first site, the second site, and the third site; and
    determine audio streams that require audio mixing as audio streams received from each site selected from among the first site, the second site, and the third site, but not the target site, from which each of the main sound source objects were received in the audio stream; and
  a transmitter coupled to the computer processor and configured to either:
    perform audio mixing on the determined audio streams that require audio mixing for the target site, and send the audio stream after the audio mixing to the target site; or
    send, to the target site, the determined audio streams that require audio mixing for the target site to perform audio mixing in the target site.

9. The audio mixing apparatus according to claim 8, wherein the computer processor is further configured to:
  decode each received audio stream; and
  calculate the sound characteristic value of each sound source object of each received audio stream.

10. The audio mixing apparatus according to claim 8, wherein the computer processor is further configured to extract the sound characteristic value of each sound source object from each received audio stream.

11. The audio mixing apparatus according to claim 8, wherein the computer processor is further configured to:
separate the main sound source objects from the determined audio streams; and
perform audio mixing on the main sound source objects according to a relationship between the target site, the first site, the second site, and the third site.

12. The audio mixing apparatus according to claim 11, wherein the computer processor is further configured to determine whether a main sound source object was received from the target site, and wherein the transmitter is further configured to perform audio mixing on the main sound source objects except main sound source objects received from the target site when the computer processor determines that a main sound source object was received from the target site.

13. The audio mixing apparatus according to claim 11, wherein the computer processor is further configured to determine whether a main sound source object was received from the target site, and wherein the transmitter is further configured to perform audio mixing on all the main sound source objects when the computer processor determines that a main sound source object was not received from the target site.

14. An audio mixing system, comprising:
a site terminal configured to:
collect an audio signal from at least one sound source object;
perform spatial audio object coding on the collected audio signal to form a down-mixed audio stream;
send the down-mixed audio stream and a spatial side information to an audio mixing apparatus, wherein the spatial side information comprises:
a maximum energy value among energy values of each sound source object in the down-mixed audio stream; and
a ratio of an energy value of each sound source object in the down-mixed audio stream to the maximum energy value among energy values of each sound source object in the down-mixed audio stream, wherein the audio mixing apparatus comprises a computer processor configured to:
receive a down-mixed audio stream and spatial side information from a plurality of site terminals, wherein at least some of the plurality of site terminals comprise a plurality of sound source objects; and
analyze the down-mixed audio stream and spatial side information of each site terminal to obtain a sound characteristic value of each sound source object corresponding to each site terminal;
select, according to a descending sequence of sound characteristic values of the first plurality of sound source objects, the second plurality of sound source objects, and the third plurality of sound source objects, a predetermined number of sound source objects from the first plurality of sound source objects, the second plurality of sound source objects, and the third plurality of sound source objects to serve as main sound source objects, wherein a portion, but not all, of each of the first plurality of sound source objects, the second plurality of sound source objects, and the third plurality of sound source objects are selected as main sound source objects for audio mixing;
select, according to a descending sequence of sound characteristic values of sound source objects, a predetermined number of sound source objects from the sound source objects to serve as main sound source objects;
determine the site terminals where the main sound source objects are located; and
determine, according to a relationship between a target site terminal and the site terminals where the main sound source objects are located, the down-mixed audio streams that require audio mixing for the target site terminal, and wherein the computer processor is further configured to either:
perform audio mixing on the determined down-mixed audio streams that require audio mixing for the target site terminal to form a mixed audio stream, and send the mixed audio stream after the audio mixing to the target site terminal; or
send, to the target site terminal via a transmitter, the determined down-mixed audio streams that require audio mixing for the target site terminal to perform audio mixing.

* * * * *